(12) United States Patent  
Etter (10) Patent No.: US 8,750,494 B2  
(45) Date of Patent: Jun. 10, 2014

(54) CLOCK SKEW COMPENSATION FOR ACOUSTIC ECHO CANCELLERS USING INAUDIBLE TONES

(75) Inventor: Walter Etter, Wayside, NY (US)

(73) Assignee: Alcatel Lucent, Paris (FR)

( * ) Notice: Subject to any disclaimer, the term of this patent is extended or adjusted under 35 U.S.C. 154(b) by 102 days.

(21) Appl. No.: 13/211,505

(22) Filed: Aug. 17, 2011

(65) Prior Publication Data

US 2013/0044873 A1 Feb. 21, 2013

(51) Int. Cl.  
*H04M 9/08* (2006.01)

(52) U.S. Cl.  
USPC ..................... 379/406.12; 381/71.1

(58) Field of Classification Search  
CPC ...................................... H04M 9/082  
USPC ............ 379/3, 406.01–406.16; 370/286, 289; 381/71.1–71.14, 94.1–94.9  
See application file for complete search history.

(56) References Cited

U.S. PATENT DOCUMENTS

| | | | |
|---|---|---|---|
| 8,320,554 B1 * | 11/2012 | Chu ......................... | 379/406.08 |
| 2003/0149495 A1 | 8/2003 | Hodges | |
| 2007/0047738 A1 * | 3/2007 | Ballantyne et al. ............. | 381/66 |
| 2007/0165838 A1 * | 7/2007 | Li et al. ..................... | 379/406.01 |
| 2008/0259828 A1 * | 10/2008 | He et al. ..................... | 370/290 |
| 2010/0074455 A1 * | 3/2010 | Frauenthal et al. ........... | 381/94.1 |
| 2010/0177884 A1 * | 7/2010 | Prakash et al. ............. | 379/406.08 |

FOREIGN PATENT DOCUMENTS

GB 2 161 676 A 1/1986

OTHER PUBLICATIONS

Pawig et al., "Adaptive Sampling Rate Correction for Acoustic Echo Control in Voice-Over-IP", IEEE Transaction on Signal Processing, vol. 50 No. 1 (2010).  
Miljkovic et al., "Clock Skew Compensation by Speech Interpolation", Digital Telecommunications, ICDT pp. 66-71 (2006).

* cited by examiner

*Primary Examiner* — Fan Tsang  
*Assistant Examiner* — Akelaw Teshale  
(74) *Attorney, Agent, or Firm* — Ryan, Mason & Lewis, LLP (57) ABSTRACT

Methods and apparatus are provided for acoustic echo cancellation in a speech signal. Acoustic echo is cancelled by inserting at least one tone in the speech signal, wherein the at least one tone is substantially inaudible to a listener; determining a clock skew between two sampling clocks based on a frequency shift of the at least one tone; re-sampling the speech signal based on the determined clock skew; and performing the acoustic echo cancellation using the re-sampled speech signal. The provided acoustic echo cancellers can be implemented, for example, as terminal-based and/or network-based acoustic echo cancellers. The tone optionally comprises an inaudible tone or multiple tones. The tone generation can be limited to only when a speech power in the vicinity of the tone frequency is larger than a pre-determined threshold, or to the beginning of a call. A level of the tone can optionally be controlled so that the tone is masked by the speech signal.

20 Claims, 6 Drawing Sheets

CLOCK SKEW COMPENSATION FOR ACOUSTIC ECHO CANCELLERS USING INAUDIBLE TONES

FIELD OF THE INVENTION

The present invention relates generally to signal processing techniques, and more particularly to echo cancellation techniques.

BACKGROUND OF THE INVENTION

With the wide-spread use of speakerphones and teleconferencing, acoustic echo cancellation has become increasingly important. In particular, an acoustic echo canceller (AEC) aims to reduce or eliminate undesired echoes. An undesired echo is generated when the loudspeaker signal feeds back into the microphone, usually by a direct path due to loudspeaker-microphone coupling and by an indirect path due to acoustic reflections of the loudspeaker signal on objects and walls. For example, in voice communications over telephone or the Internet, a speaker will hear a delayed and filtered version of his own voice, if acoustic echo is not sufficiently reduced by the terminal associated with the other party to the telephone communication.

For an effective application of an AEC in a terminal, the sampling rates in a digital-to-analog (D/A) convertor that reconstructs the analog signal to be sent to the loudspeaker and an analog-to-digital (A/D) convertor that samples the speech signal picked up by the microphone should match exactly. It has been found that even a small clock skew between the sampling rates can significantly degrade the performance of an AEC. Generally, the reliability of the AEC degrades as the sampling rate offset between the loudspeaker and microphone signals increases. Clock skew in the sampling rates of a terminal is a frequent problem, for example, in PC-based software terminals. Sampling rate skew can always be assumed, if, e.g., an external USB camera is used with its built-in microphone and A/D convertor for audio recording in conjunction with a separate soundboard for audio playback. In this case, the A/D and D/A convertors do not derive their clock from a common reference (quartz clock), and therefore are not synchronized.

Clock skew compensation methods exist for deployment in terminals. Such terminal-based methods typically make use of read and write pointer locations in buffers associated with the D/A and A/D convertors. For example, when the receive (RX) buffer read-pointer increments faster than the transmit (TX) buffer write-pointer, the sampling rate of the D/A convertor is greater than the sampling rate of the A/D convertor. Therefore, the difference between the read-pointer increments per specified time for the receive buffer and the write-pointer increments for the transmit buffer can be used to estimate the clock offset or sampling rate offset. The resulting offset can then be used to control a re-sampling rate of one of the signals in order to achieve the same sampling rate for the loudspeaker and microphone signals. See, for example, M. Pawig and G. Enzner, "Adaptive Sampling Rate Correction for Acoustic Echo Control in Voice-Over-IP," IEEE Trans. on Signal Processing, Vol. 58, No. 1 (January 2010); or D. Miljkovic et al., "Clock Skew Compensation by Speech Interpolation," IEEE Int'l Conf. on Digital Telecommunications (2006), each incorporated by reference herein.

When acoustic echo is insufficiently suppressed or cancelled in a terminal, acoustic echo cancellation can be attempted remotely in the network. A number of technical problems exist, however, for network-based acoustic echo cancellation. For example, the above-described terminal-based clock skew compensation technique cannot be applied in the network, since the read-pointer and write-pointer positions are not accessible from a remote location such as the network.

Thus, existing network services provide only acoustic echo suppression (AES). The perceptual performance of an acoustic echo suppressor, however, is significantly inferior to the perceptual performance of an AEC. A particular drawback of AES is the lack of transparency in a call, apparent when both ends attempt to talk simultaneously. In its rudimentary form, an AES allows only one end to talk (similar to a half-duplex communication mode) by inserting a loss in one signal path. Even though enhancements such as comfort noise insertion can improve the perceived communication quality, the performance of an acoustic echo suppressor is still significantly inferior to the performance of a true AEC.

A need therefore exists for improved techniques for compensating for clock skew arising in a terminal, to allow for an effective application of an AEC. A further need exists for clock skew compensation techniques that can be employed in a terminal or in the network.

SUMMARY OF THE INVENTION

Generally, methods and apparatus are provided for acoustic echo cancellation in a speech signal. According to one aspect of the invention, acoustic echo is cancelled by inserting at least one tone in the speech signal, wherein the at least one tone is substantially inaudible to a listener; determining a clock skew between two sampling clocks based on a frequency shift of the at least one tone; re-sampling the speech signal based on the determined clock skew; and performing the acoustic echo cancellation using the re-sampled speech signal. The provided acoustic echo cancellers can be implemented, for example, as terminal-based and/or network-based acoustic echo cancellers.

The tone may comprise, for example, an inaudible tone, such as a high-pitched tone or a tone above the maximum detectable frequency (i.e., inaudible due to its frequency). In addition, the tone optionally comprises multiple tones. In various embodiments, the tone can be generated only if a speech power in the vicinity of the tone frequency is larger than a pre-determined threshold, or only at a beginning of a call.

According to another aspect of the invention, a level of the tone can optionally be controlled so that the tone is masked by the speech signal. For example, a level of the tone can be controlled by a masking threshold derived from a speech signal.

A more complete understanding of the present invention, as well as further features and advantages of the present invention, will be obtained by reference to the following detailed description and drawings.

DETAILED DESCRIPTION

The present invention provides methods and apparatus for clock skew compensation for use with acoustic echo cancellers. According to one aspect of the invention, a tone, such as an inaudible tone, is added to the speech signal. The tone is used to estimate the sampling rate mismatch and to adapt a re-sampler accordingly. In one exemplary embodiment, a high-pitched tone is used, whereby the level of the tone can be controlled such that the tone is being masked by the speech signal. In an alternate implementation, the tone level is set to a fixed level, which leads to an audible tone at times.

Figure 1:
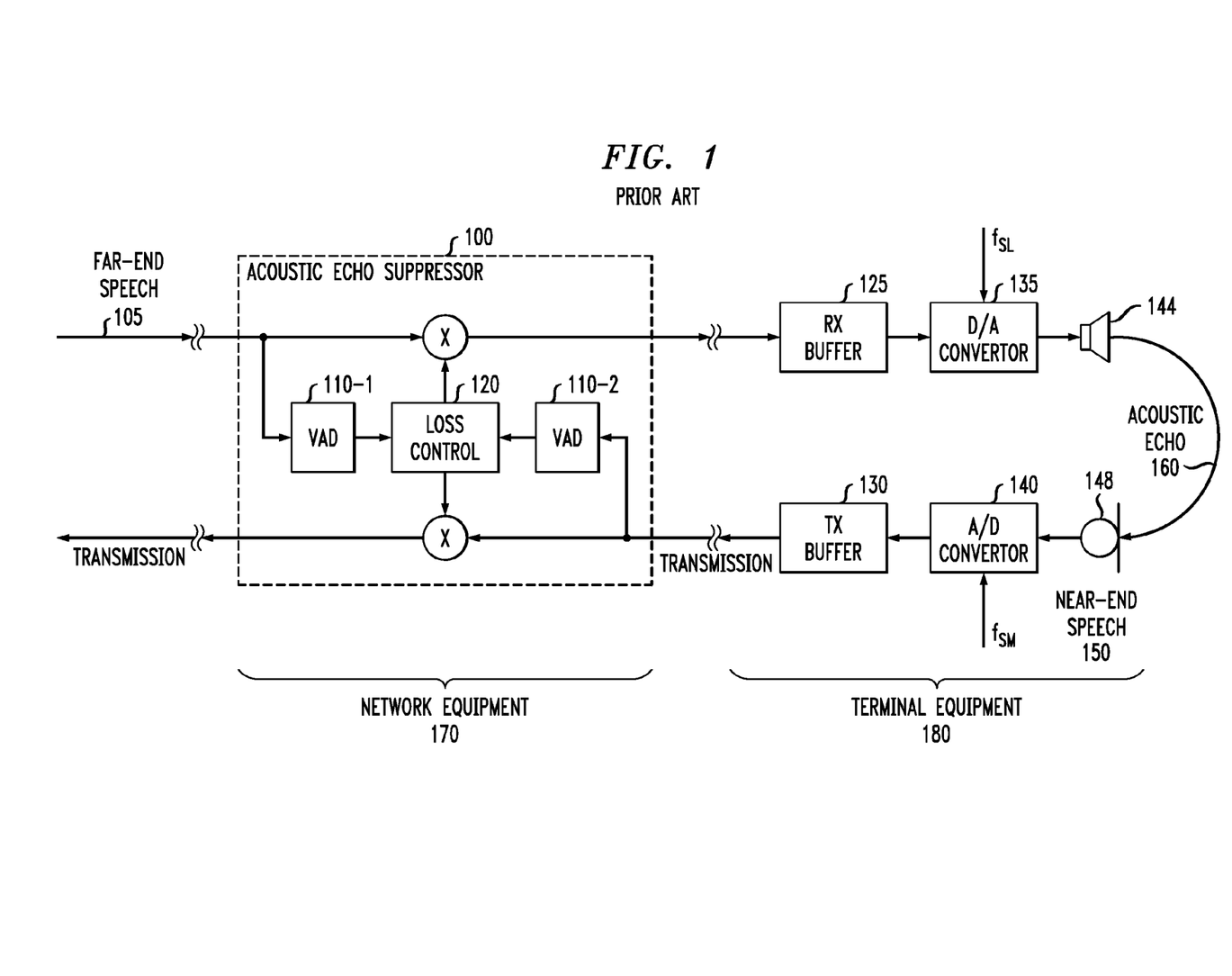
FIG. 1 illustrates a conventional network-based Acoustic Echo Suppressor (AES)

FIG. 1 illustrates a conventional network-based Acoustic Echo Suppressor (AES) 100. To refer to the two sides or ends of a call, the terms 'near-end' and 'far-end' are used herein. Even though the problem of acoustic echo can arise on both ends, only one end is discussed herein for ease of illustration, since the same echo mitigation solution can typically be applied to either side as would be apparent to a person of ordinary skill in the art. In other words, in the present description, the terms 'near-end' and 'far-end' can be interchanged throughout the discussion. Therefore, without loss of generality, only one side is described. As shown in FIG. 1, the AES 100 is part of the network equipment 170. A Voice Activity Detector (VAD) 110-1, 110-2 for each far-end speech 105 and near-end speech 150, respectively, provides input to a loss control block 120. The loss control block 120 inserts a loss either on the far-end signal 105 or near-end signal 150 based on voice activity detected by the VADs 110-1, 110-2. In contrast to a true Acoustic Echo Canceller (AEC), the AES 100 is immune to sampling rate differences in the terminal equipment 180.

As shown in FIG. 1, the terminal equipment 180 comprises a receive buffer 125 that stores the received far-end signal 105. A D/A convertor 135 converts the digital received far-end signal 105 to an analog signal that is applied to a loudspeaker 144. In addition, the analog near-end speech signal 150 generated by a microphone 148 is converted by an A/D convertor 140 to a digital signal that is stored in a transmit buffer 130 prior to transmission over the network. These buffers allow efficient coding and transmission of the signal. Acoustic echo 160 results from the coupling between the loudspeaker 144 and the microphone 148 of the terminal 180. AES is generally considered to be immune to sampling rates differences between a sampling clock, $f_{SL}$, that controls the D/A convertor 135 and a sampling clock, $f_{SM}$, that controls the A/D convertor 140.

For ease of illustration, well-known comfort noise insertion and double-talk detection techniques by the AES 100 are not shown in FIG. 1. Likewise, well-known speech codecs in the network equipment 170 and terminal equipment 180 are also not shown for ease of illustration.

Figure 2:
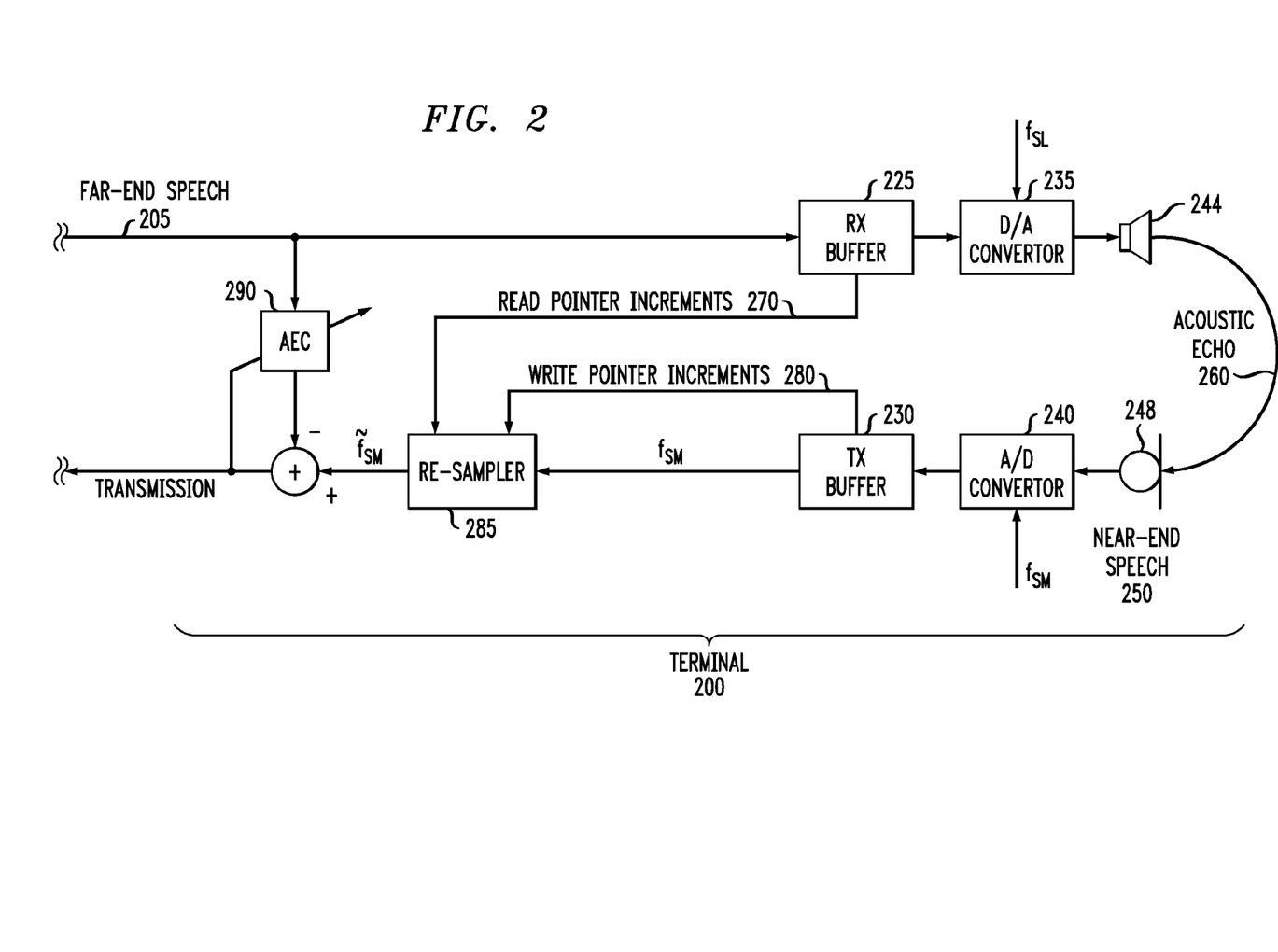
FIG. 2 illustrates a conventional terminal-based Acoustic Echo Canceller (AEC) deployed in a terminal.

FIG. 2 illustrates a conventional terminal-based Acoustic Echo Canceller (AEC) 290 deployed in a terminal 200. As shown in FIG. 2, the terminal 200 comprises a receive buffer 225 that stores the received far-end signal 205. A D/A convertor 235 converts the digital received far-end signal 205 to an analog signal that is applied to a loudspeaker 244. In addition, the analog near-end speech signal 250 generated by a microphone 248 is converted by an A/D convertor 240 to a digital signal that is stored in a transmit buffer 230 prior to transmission over the network (not shown in FIG. 2). Acoustic echo 260 results from the coupling between the loudspeaker 244 and the microphone 148 of the terminal 280 and off wall reflections. As previously indicated, AEC is susceptible to sampling rates differences between the sampling clock, $f_{SL}$, that controls the D/A convertor 235 and the sampling clock, $f_{SM}$, that controls the A/D convertor 240.

As previously indicated, and as shown in FIG. 2, to enable acoustic echo cancellation in a terminal 200 with sampling rates differences between the sampling clock frequency, $f_{SL}$, and the sampling clock frequency, $f_{SM}$, the near-end speech signal 250 is re-sampled using a re-sampler 285 such that the resulting sampling rate, $\tilde{f}_{SM}$, equals the sampling rate, $f_{SL}$, that controls the D/A convertor 235. The re-sampling is based on the difference between receive buffer read-pointer increments 270 and transmit buffer write-pointer increments 280 per predefined time interval. Since the network equipment does not have access to these pointers, this re-sampling method can only be performed in the terminal 200 (and not the network). Since terminals (in particular IP soft-phones on PC) rarely take care of the echo in this manner, a need still exists for network-based echo processing.

For a more detailed discussion of the AEC 290, see, for example, S. Haykin, "Adaptive Filter Theory," Prentice Hall (2001), incorporated by reference herein. Generally, the AEC 290 adaptively filters the far-end speech signal 205 to mirror the echo path and subtracts the filtered signal, the estimated echo, from the near-end speech signal 250, in a well-known manner.

Figure 3:
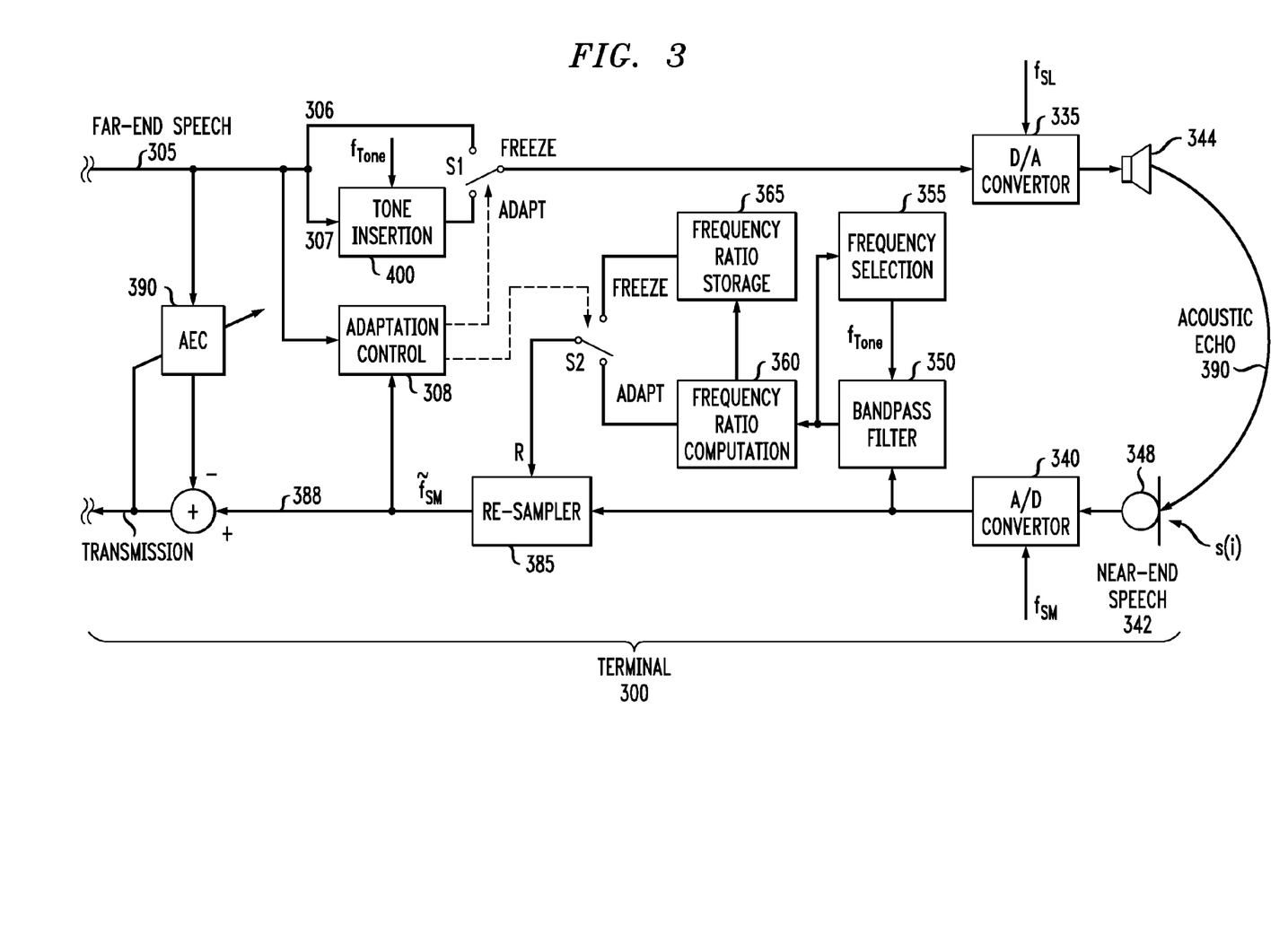
FIG. 3 illustrates a terminal-based Acoustic Echo Canceller (AEC) deployed in a terminal that employs clock skew compensation techniques in accordance with the present invention.

FIG. 3 illustrates a terminal-based Acoustic Echo Canceller (AEC) 390 deployed in a terminal 300 that employs clock skew compensation techniques in accordance with the present invention. As discussed hereinafter, an aspect of the present invention implements re-sampling based on an inserted tone. The inserted tone can optionally be a masked tone. The receive buffer and transmit buffer are omitted from FIG. for ease of illustration.

As shown in FIG. 3, a tone having a frequency, $f_{Tone}$, is generated by a Tone Insertion block 400, discussed further below in conjunction with FIG. 4. When switches S1 and S2 are in an 'Adapt' position, a far-end speech signal 305 and an inserted tone is passed to the D/A convertor 335 and then applied to the loudspeaker 344, and subsequently picked up by the microphone 348. Generally, the inserted tone will shift in frequency due to the clock skew between the sampling frequency, $f_{SL}$, and the sampling frequency, $f_{SM}$. To estimate the frequency shift (or frequency ratio), the shifted tone is filtered by a bandpass filter 350 and further analyzed in a frequency ratio computation block 360. The bandpass filter 350 filters the shifted tone, using a narrow band with a center frequency equaling the tone frequency $f_{Tone}$, generated by a frequency selector 355. Block 355 starts with a pre-set frequency. If the output level of the bandpass filter 350 is below a desired threshold, for example, due to a notch of the frequency response of the loudspeaker-enclosure-microphone system (i.e., the combined frequency response of the loudspeaker, room, and microphone), frequency selection block 355 changes to another pre-set frequency. Accordingly, tone insertion block 400 generates a tone with the new frequency. Frequency selection 355 may cycle through a number of pre-set frequencies, until a level requirement for the output signal of the bandpass filter 350 is met. The frequency ratio computation block 360 determines the frequency offset of the filtered tone and computes a corresponding re-sampling ratio, R, that is stored in block 365. The re-sampling block 385 re-samples the near-end signal 350 such that the resulting sampling frequency, $\tilde{f}_{SM}$, equals the sampling frequency, $f_{SL}$, that controls the D/A convertor 335. Resampling techniques are well-known> See for example, T. I. Laakso et al., "Splitting the Unit Delay—Tools for Fractional Delay Filter Design," IEEE Signal Process. Magazine (January 1996), incorporated by reference herein.

As mentioned above, a simple frequency ratio computation algorithm can be derived from the number of cycles in a pre-determined assessment time TA of e.g. 1-2 seconds. The desired resampling ratio for the resampler 385 is given by R=fSL/fSM. Since the cycle periods for the two tone frequencies can be denoted as TSL=1/fSL and TSM=1/fSM, the number of cycles in the assessment period can be expressed as NSL=TA/TSL and NSM=TA/TSM. Since TSL is known, NSL can be calculated exactly. In contrast, NSM has to be estimated from the signal. For example, estimation of NSM can be implemented by counting the number of positive zero crossings within the assessment interval TA. With the number of cycles (which equals the number of positive zero crossings), the resampling ratio can be determined as R=NSL/NSM. Accuracy in determining R can be improved if fractional sample units are calculated (i.e., if the two tone signals are oversampled).

Adaptation control 308 uses the far-end speech 305 and the resampled near-end speech 388 (or near-end speech 342 with the original sampling rate) to determine whether far-end talker, near-end talker, or both (so called double talk), are talking. Such detection is also necessary for the adaptation of the acoustic echo cancellation (not shown), and may therefore be derived from the AEC control. The condition that the near-end talker is silent (i.e., near-end talker not talking) has to be fulfilled to set switches S1 and S2 to the 'adapt' position. If the near-end talker is talking, the adaptation control sets switches S1 and S2 to the 'freeze' position, which means that no tone is sent to the near-end loudspeaker and that the frequency ratio is not updated, but a previously determined frequency ratio stored in 365 is used.

If a call duration is limited, and temperature fluctuation of the terminal (more precisely, the quartz that determines the sampling rate) is limited, it may suffice to perform the adaptation of the frequency ratio computation only at the beginning of a call or a session. In other words, it may suffice to run the adaptation of the resampling ratio via the frequency ratio computation block 360 only in a call setup procedure that may last for, e.g., 1-2 seconds only. That is, switches S1 and S2 are in an 'adapt' position only during a short setup interval, while for the rest of the call, switches S1 and S2 are in the 'freeze' position.

Alternatively, adaptation may be performed only once every, e.g., 10 minutes for a duration of, e.g., 1-2 seconds. Even if an alternative simpler tone insertion method 500 is used, as discussed further below in conjunction with FIG. 5, such rare audible tone spurts are generally well tolerated by call participants.

Alternatively, adaptation may be performed only during time instances when the far-end speech signal 305 contains sufficient energy in high frequency bands, for example, during fricative phonemes such as 's' and 'f'. Sufficient energy in high frequency bands permits a higher tone level, which in turn improves reliability of the frequency ratio computation block 360. The presence of sufficient energy in high frequency bands can be obtained by means of high-pass filtering of the far-end speech signal, followed by a root-mean-square (RMS) operation, followed by threshold detection.

Based on any of the above described adaptation methods for tone insertion 400 and frequency ratio computation 360, a common control signal for switches S1 and S2 is obtained.

Though a common control signal is used for switches S1 and S2, the control signal for S2 has to be delayed to account for the roundtrip delay that the signal undergoes from the output of switch S1 to the input of the resampler 385. For example, delay occurs in D/A convertor 335 and A/D convertor 340, but may also occur in other signal processing blocks that are not shown in Terminal 300. In a network implementation, discussed below, additional delay is caused by network transmission, and the audio encoder/decoder. The roundtrip delay can be estimated similar to roundtrip delay estimation techniques in traditional line echo cancellers by means of, for example, correlation. In a network implementation, the roundtrip delay may vary over time and deviate from a determined nominal roundtrip delay. In this case, it is necessary to detect the precise beginning of the tone in frequency ratio computation block 360.

As indicated above, the exemplary AEC 390 adaptively filters the far-end speech signal 305 and subtracts the filtered signal from the resampled near-end speech signal 350, to account for the frequency response of the echo path, in a similar manner to FIG. 2.

Figure 4:
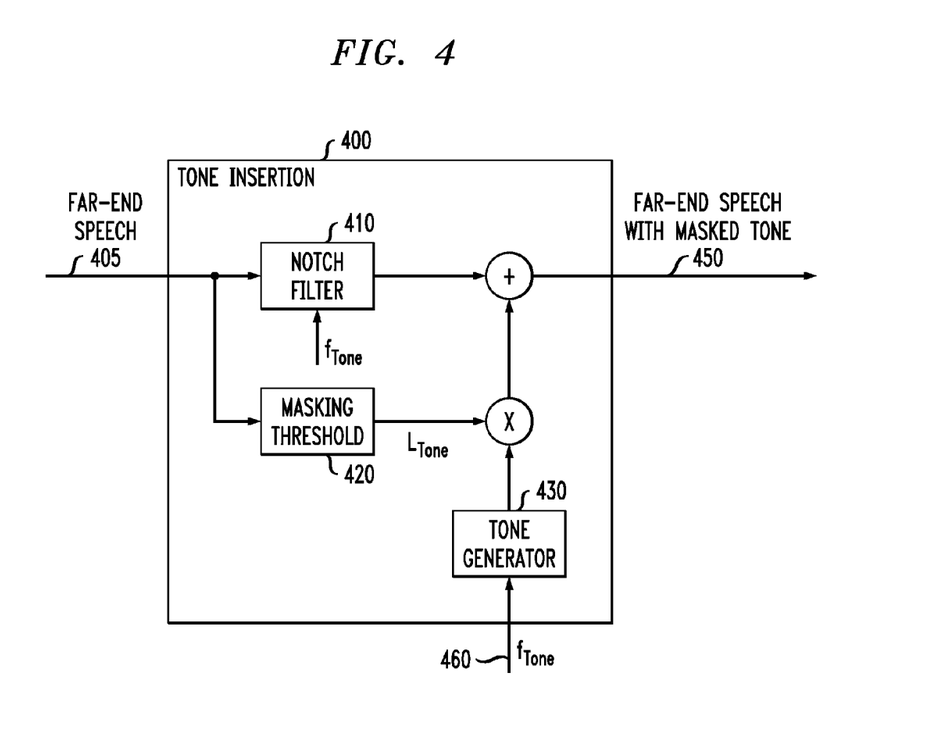
FIG. 4 illustrates the Tone Insertion block of FIG. 3 in further detail.

FIG. 4 illustrates the Tone Insertion block 400 of FIG. 3 in further detail. As shown in FIG. 4, a tone with frequency, $f_{Tone}$, is generated by a tone generator 430 and added to a version of the far-end speech signal 405 by an adder. In one exemplary implementation, the far-end speech signal 405 is optionally filtered by a notch filter 410 that filters out a narrow band of the speech signal 405 with center frequency, $f_{Tone}$, of the inserted tone. The ability to set the tone frequency is useful in order to avoid potential notches in the frequency response of the loudspeaker-enclosure-microphone (LEM) system In addition, in an exemplary implementation, a masking threshold 420 at the tone frequency is determined such that the tone is being masked by speech (as perceived by a listener), based on the speech signal. For this purpose, the masking threshold at the tone frequency is calculated from the speech signal. See, for example, H. Fastle and E. Zwicker, "Psychoacoustics: Facts and Models" Springer (2006). Generally, the masking threshold 420 indicates, for the given frequency, $f_{Tone}$, the tone level, $L_{Tone}$, at which the tone becomes inaudible. The tone level, $L_{Tone}$, is set to no higher than the masking threshold 420. As shown in FIG. 4, the exemplary output of the tone generator 430 is multiplied with the tone level, $L_{Tone}$, computed by the masking threshold 420 and added to the output of the notch filter 410, to generate a far-end speech signal 450 that includes the masked tone. The optional notch filter 410 improves the performance of the frequency ratio computation 360 (FIG. 3), since the inserted tone is easier to identify in absence of speech frequency components in the vicinity of the tone frequency.

For example, the frequency, $f_{Tone}$, may be a high-pitched frequency ($f_s/4 < f_{Tone} < f_s/2$), where $f_s$ is the sampling frequency. For a wide-band speech signal with a sampling frequency of 16 kHz, the tone frequency may be set to 6 kHz. Such a high tone frequency has the advantage that a frequency offset can accurately be detected by a simple low-complexity time-domain algorithm. For example, the number of tone cycles in a predefined time interval (on the order of, e.g., 1-2 seconds) can be counted by detecting the zero crossings of the signal. However, the higher the tone frequency, the less the tone will be masked by the speech signal. The masking threshold will continuously change as speech progresses through different phonemes. For example, consider the word 'so'. The fricative 's' has significant energy in the vicinity of a tone frequency of 6 kHz, resulting in a higher masking threshold at the tone frequency. In contrast, the voiced vowel 'o' has most energy in lower frequencies, resulting in a low masking threshold at a tone frequency.

Generally, a higher masking threshold is desirable, since it allows injection of a higher level of the tone, which in turn increases the accuracy and robustness of the frequency ratio computation. In other words, the robustness and accuracy of the frequency ratio estimation depends on the signal-to-noise ratio (SNR). The SNR increases proportionally to the level of the tone. However, the accuracy of the frequency ratio computation is not only determined by the tone level, but also by the reliability of near-end speech detection. Wrong detection of a near-end speech silence period can result in activation of the adaptation of the frequency ratio computation algorithm (instead of freezing, i.e., not updating the ratio). For the frequency ratio computation, near-end speech is considered noise. Wrong detection of near-end speech silence hence decreases the SNR.

Figure 5:
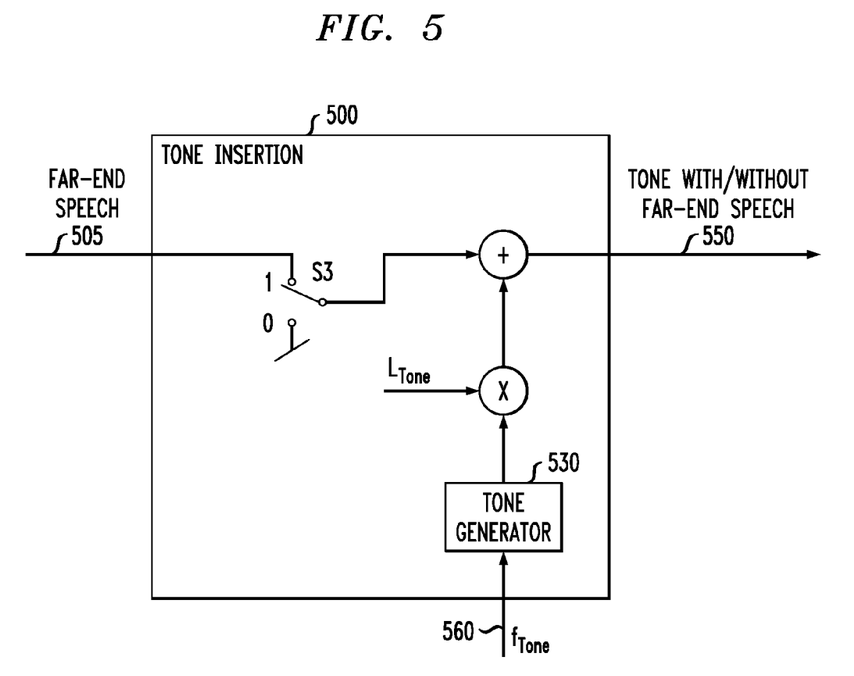
FIG. 5 illustrates an alternative tone insertion method to the technique shown in FIG. 4.

FIG. 5 describes a rudimentary tone insertion method. It can operate in two modes. When switch S3 is in position 0, speech is replaced with the tone during the time interval of adaptation. When switch S3 is in position 1, the tone is added to the far-end speech signal 505. Tone insertion block 500 produces a tone via a tone generator 530, similar to tone insertion block 400. The tone level is set to a fixed level, optionally only depending on the level of the far-end speech or/and level of near-end speech.

To prevent overflow, the far-end speech signal 505 may be limited in amplitude or scaled by a factor smaller than one, whereby such overflow prevention has to be applied to both signal paths 306 and 307 (shown in FIG. 3) in order to avoid amplitude changes when switch S1 position is changed. When professional audio transmission is used at, e.g., 48 kHz, the tone can also be made inaudible if it is set at a frequency of greater than or equal to about 19 kHz. In this case, the tone no longer has to be masked by the speech signal, since its frequency is beyond the maximum frequency that the human auditory system can perceive.

Figure 6:
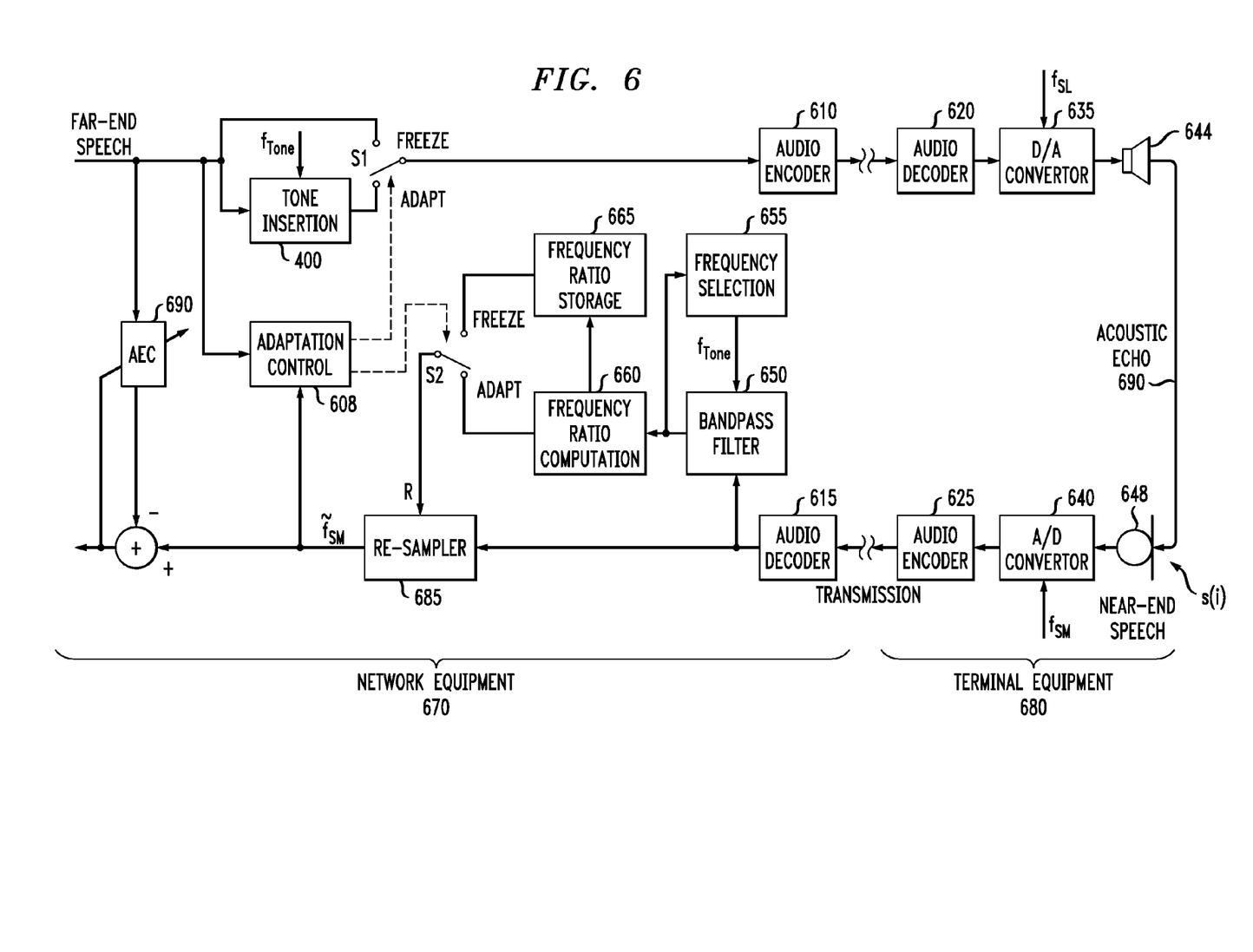
FIG. 6 illustrates a network-based Acoustic Echo Canceller (AEC) deployed in network equipment that employs clock skew compensation techniques in accordance with the present invention.

FIG. 6 illustrates a network-based Acoustic Echo Canceller (AEC) 690 deployed in network equipment 670 that employs clock skew compensation techniques in accordance with the present invention. As discussed hereinafter, an aspect of the present invention implements a network realization of re-sampling based on an inserted tone. The level of the inserted tone can optionally be controlled such that the tone is being masked by speech or the level of the inserted tone can be set to a fixed value. The receive buffer and transmit buffer are omitted from FIG. for ease of illustration.

As shown in FIG. 6, a tone having a frequency $f_{Tone}$, is generated by a Tone Insertion block 400, discussed above in conjunction with FIG. 4. When switches S1 and S2 are in an Adapt position, a tone is transmitted in the network 670 by an audio encoder 610 and then decoded at the terminal 680 by a decoder 620. A D/A convertor 635 converts the decoded digital received far-end signal having the masked tone to an analog signal that is applied to a loudspeaker 644, in a similar manner as FIGS. 1-3. In addition, the analog near-end speech signal 650 generated by a microphone 648 is converted by an A/D convertor 640 to a digital signal that is encoded by an encoder 625 in the terminal 680 and then decoded by a decoder 615 in the network equipment 670. Acoustic echo 660 results from direct sound and reflected sound from loudspeaker 644 to microphone 648 of the terminal 680.

Generally, the inserted tone will shift in frequency due to the clock skew between the sampling clock $f_{SL}$ and the sampling clock $f_{SM}$. The shifted tone is filtered by a bandpass filter 650 and further analyzed in an frequency ratio computation block 660. The bandpass filter 650 filters the shifted tone, using a narrow band centered at the original tone frequency $f_{Tone}$, generated by a frequency selector 655. The frequency ratio computation block 660 determines the frequency ratio $R=f_{SL}/f_{SM}$ between the original and filtered tone. This ratio is the desired re-sampling ratio, to be used in the re-sampler, in a similar manner to the terminal-based implementation of FIG. 3. Additionally, the re-sampling ratio is stored in block 665. The re-sampling block 685 re-samples the near-end signal 650 such that the resulting sampling rate, $\tilde{f}_{SM}$, equals the sampling rate, $f_{SL}$, that controls the D/A convertor 335.

As indicated above, the exemplary AEC 690 adaptively filters the far-end speech signal 605 and subtracts the filtered signal from the resampled near-end speech signal 650, to account for the echo path, in a similar manner to FIGS. 2 and 3.

For the network-based implementation of FIG. 6, the tone level, $L_{Tone}$, is set such that the tone is not lost through the audio encoding/decoding process 610, 620. For low bit-rate audio/speech codecs, the derived tone level, $L_{Tone}$, may make the tone audible, or it may be necessary to increase the tone level to pass it through the encoding/decoding process. Alternatively, multiple tones can be generated simultaneously at different frequencies to ensure transmission. Due to the short duration of the tone (on the order of, e.g., 1-2 seconds), a slightly audible tone is acceptable. For, e.g., PCM (pulse code modulation) encoding/decoding, tone-masking can be fully applied, making the tone inaudible.

A multi-tone method has two further benefits. First, there is no need to cycle through different frequencies in case of notches in the LEM frequency response at the tone frequencies, which means that only one assessment interval TA is needed as opposed to multiple intervals. In other words, a multi-tone solution may adapt in a shorter time. The second advantage of a multi-tone solution is that the masking threshold at a particular tone frequency may not be sufficiently high for reliable frequency ratio computation, while at another tone frequency, the masking threshold may be sufficiently high. A multi-tone can be generated in a similar manner to the single tone of FIGS. 4 and 5, as would be apparent to a person of ordinary skill in the art As previously indicated, the arrangements of clock skew compensation systems, as described herein, provide a number of advantages relative to conventional arrangements. As indicated above, the disclosed techniques for implementing clock skew compensation allows for effective applications of acoustic echo cancellation. Also, the disclosed clock skew compensation techniques can be implemented in a terminal or in the network.

Again, it should be emphasized that the above-described embodiments of the invention are intended to be illustrative only. In general, the exemplary clock skew compensation techniques can be modified, as would be apparent to a person of ordinary skill in the art, to insert a tone and thereby determine a re-sampling frequency. In addition, the disclosed techniques for clock skew compensation can be employed in any terminal or network environment where acoustic echo may be encountered.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

I claim:

1. A method for acoustic echo cancellation in a speech signal, comprising:
    inserting at least one tone in said speech signal, wherein said at least one tone is substantially inaudible to a listener;
    determining a clock skew between two sampling clocks based on a frequency shift of said at least one tone;
    re-sampling said speech signal based on said determined clock skew; and
    performing said acoustic echo cancellation using said re-sampled speech signal.

2. The method of claim 1, wherein said method is implemented in a terminal device.

3. The method of claim 1, wherein said method is implemented in a network device.

4. The method of claim 1, wherein said at least one tone comprises one or more of a high-pitched tone and a tone having a frequency that is not audible by a listener.

5. The method of claim 1, further comprising the step of controlling a level of said at least one tone an that said at least one tone is masked by said speech signal.

6. The method of claim 1, wherein said at least one tone is a fixed level.

7. The method of claim 1, wherein said at least one tone comprises multiple tones.

8. The method of claim 1, wherein said at least one tone is only generated at a beginning of a call.

9. The method of claim 1, wherein a level of said at least one tone is controlled by a masking threshold derived from a speech signal.

10. The method of claim 1, wherein said at least one tone is generated only if a speech power in the vicinity of the tone frequency is larger than a pre-determined threshold.

11. An apparatus for cancelling acoustic echo in a speech signal, comprising:
    a tone generator for inserting at least one tone in said speech signal, wherein said at least one tone is substantially inaudible to a listener; and
    an offset computation circuit for determining a clock skew between two sampling clocks based on a frequency shift of said at least one tone;
    a re-sampling circuit for re-sampling said speech signal based on said determined clock skew; and
    an acoustic echo canceller that cancels said acoustic echo using said re-sampled speech signal.

12. The apparatus of claim 11, further comprising at least one bandpass filter for filtering a band that includes said at least one tone.

13. The apparatus of claim 11, further comprising at least one notch filter for filtering out a band in said speech signal corresponding to said at least one tone.

14. The apparatus of claim 11, wherein said apparatus is implemented in one or more of a terminal device and a network device.

15. The apparatus of claim 11, wherein said at least one tone comprises one or more of a high-pitched tone, a tone having a frequency that is not audible by a listener and a fixed level.

16. The apparatus of claim 11, wherein said tone generator controls a level of said at least one tone so that said at least one tone is masked by said speech signal.

17. The apparatus of claim 16, wherein said level of said at least one tone is controlled by a masking threshold derived from said speech signal.

18. The apparatus of claim 11, wherein said at least one tone comprises multiple tones.

19. The apparatus of claim 11, wherein said at least one tone is only generated at a beginning of a call.

20. The apparatus of claim 11, wherein said at least one tone is generated only if a speech power in the vicinity of the tone frequency is larger than a pre-determined threshold.

* * * * *